(12) United States Patent
Somal et al.

(10) Patent No.: US 11,991,056 B1
(45) Date of Patent: May 21, 2024

(54) GRAPHICAL DIAGNOSIS AND REMEDIATION OF IMPAIRMENTS WITHIN A SERVICE PROVIDER NETWORK

(71) Applicant: CSC Holdings, LLC, Bethpage, NY (US)

(72) Inventors: Shashank Somal, East Meadow, NY (US); Rajesh Khandelwal, Princeton Junction, NJ (US); Mahesh Singh, Roslyn Heights, NY (US); Christopher Bhim, South Ozone Park, NY (US); Kathleen Ziet, New Hyde Park, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 17/842,623

(22) Filed: Jun. 16, 2022

(51) Int. Cl.
| | |
|---|---|
| *H04L 41/5074* | (2022.01) |
| *H04L 41/0631* | (2022.01) |
| *H04L 41/22* | (2022.01) |
| *H04L 41/507* | (2022.01) |

(52) U.S. Cl.
CPC ...... *H04L 41/5074* (2013.01); *H04L 41/0631* (2013.01); *H04L 41/22* (2013.01); *H04L 41/507* (2013.01)

(58) Field of Classification Search
CPC ... H04L 41/0631; H04L 41/22; H04L 41/507; H04L 41/5074
USPC ........................................................ 709/224
See application file for complete search history.

(56) References Cited

U.S. PATENT DOCUMENTS

| | | | | |
|---|---|---|---|---|
| 7,257,741 B1* | 8/2007 | Palenik | ................. | G06F 11/079 714/4.3 |
| 7,274,932 B1* | 9/2007 | Iyer | ................. | H04W 24/08 455/67.11 |
| 7,856,574 B2* | 12/2010 | Johnson | ................. | H04L 43/10 714/25 |
| 2008/0250264 A1* | 10/2008 | Hourselt | ................. | G06Q 10/06 714/2 |
| 2011/0047150 A1* | 2/2011 | Wolf | ................. | G06F 11/2294 707/723 |
| 2013/0090938 A1* | 4/2013 | Fishman | ................. | G16H 40/67 705/2 |
| 2014/0029407 A1* | 1/2014 | Madonna | ............ | H04L 43/0811 370/216 |
| 2015/0120389 A1* | 4/2015 | Zhang | ................. | G06Q 10/10 705/7.32 |

(Continued)

*Primary Examiner* — David P Zarka
(74) *Attorney, Agent, or Firm* — Sterne, Kessler, Goldstein & Fox P.L.L.C.

(57) ABSTRACT

Systems, methods, and apparatuses disclosed herein can receive an inquiry from a subscriber of a service that describes a symptom of an impairment within the service provider network that is being experienced by the subscriber which is causing the service to not perform as expected. These systems, methods, and apparatuses can identify a symptom indicator from among multiple symptom indicators that corresponds, or most closely corresponds, to the symptom that is described by the subscriber. Thereafter, these systems, methods, and apparatuses can identify a remediation action from among multiple remediation actions that corresponds to the symptom indicator. In some situations, these systems, methods, and apparatuses can perform the remediation action to diagnose and/or to remedy the impairment within the service provider network.

24 Claims, 7 Drawing Sheets

(56) References Cited

U.S. PATENT DOCUMENTS

Figure 1:
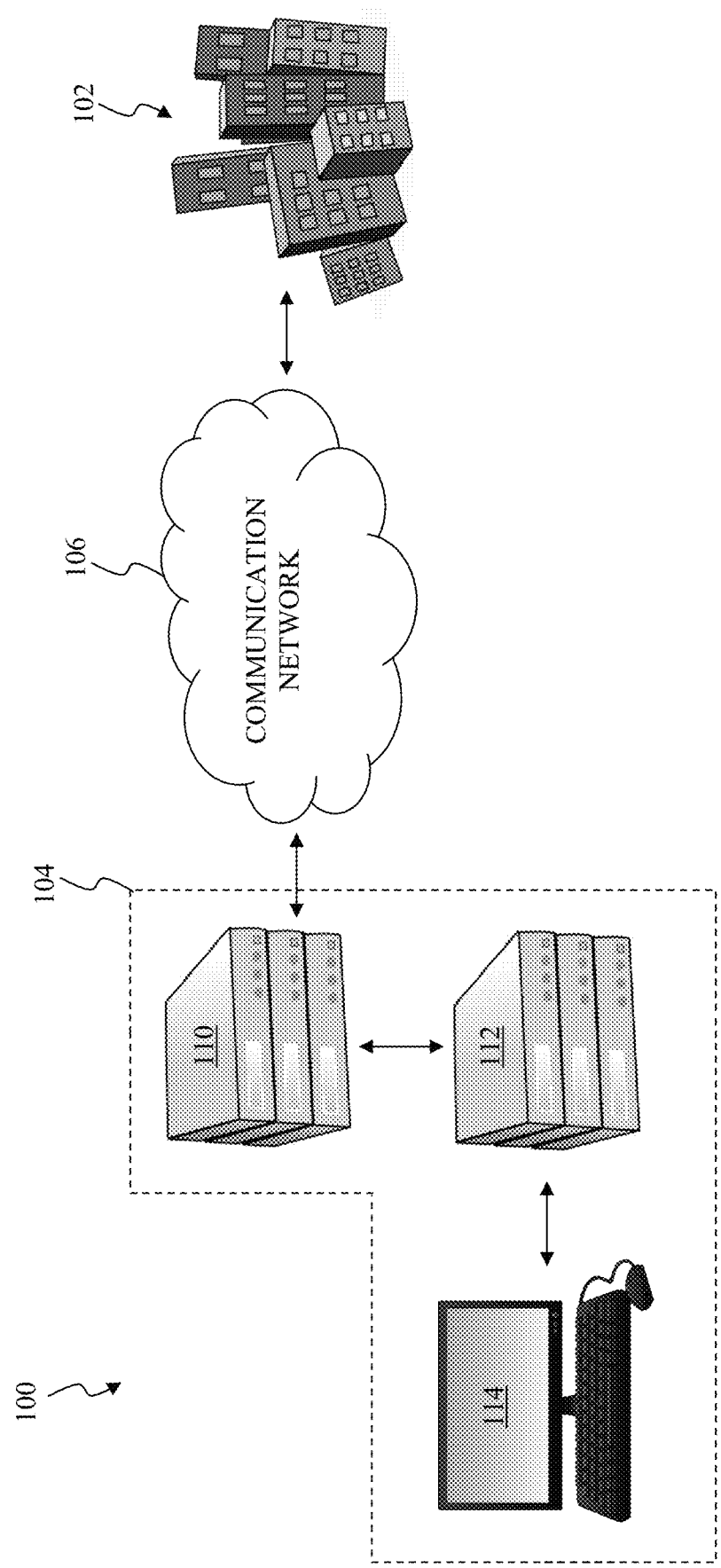

| | | | | |
|---|---|---|---|---|
| 2015/0140986 A1* | 5/2015 | Lamb | .................. | H04L 41/0659 |
| | | | | 455/418 |
| 2015/0235132 A1* | 8/2015 | Allen | .................... | G06F 16/951 |
| | | | | 706/11 |
| 2015/0295784 A1* | 10/2015 | Kim | ........................ | H04L 41/22 |
| | | | | 709/223 |
| 2016/0027019 A1* | 1/2016 | Michaelangelo | ............................ | |
| | | | | G06Q 10/06316 |
| | | | | 705/7.26 |
| 2017/0098200 A1* | 4/2017 | Merg | .................. | G06F 3/04817 |
| 2017/0371537 A1* | 12/2017 | Sato | ...................... | G06F 3/1253 |
| 2018/0054655 A1* | 2/2018 | Rahman | ............... | H04N 21/654 |
| 2020/0383875 A1* | 12/2020 | Banov | ..................... | G16H 80/00 |
| 2020/0394784 A1* | 12/2020 | Toth | ...................... | G06T 7/0004 |
| 2021/0083926 A1* | 3/2021 | Costa | .................. | H04L 41/0813 |
| 2021/0166802 A1* | 6/2021 | Neumann | .............. | G06N 20/00 |
| 2021/0204137 A1* | 7/2021 | Wasily | ................ | H04W 12/086 |
| 2022/0026334 A1* | 1/2022 | Tamraz | ................ | G01N 1/2273 |
| 2022/0122742 A1* | 4/2022 | Satake | ................... | G16H 50/30 |
| 2022/0188738 A1* | 6/2022 | Brown | .................. | G06N 20/00 |

\* cited by examiner

GRAPHICAL DIAGNOSIS AND REMEDIATION OF IMPAIRMENTS WITHIN A SERVICE PROVIDER NETWORK

BACKGROUND

A service provider network provides a service, such as communication of video, audio, and/or data to provide some examples, to one or more subscriber premises that are associated with one or more subscribers of the service. In some situations, an impairment, such an error, a fault, and/or a failure to provide some examples, can be present within the service provider network. The error represents a human action that produces an incorrect result. As an example, the error can include failing to plug the electronic device into an appropriate electrical socket. The fault represents a manifestation of an error in an electronic device of the service provider network, also known as a defect or a bug. The fault can be hardware-based that is manifested in the hardware of the service provider network and/or software-based that is manifested in the software executing within the service provider network. The failure represents a deviation of an electronic device of the service provider network from its intended operation. For example, the failure can occur when the electronic device produces the incorrect result or does not perform the correct action. The error, the fault, and/or the failure can cause the service provided by the service provider network to not perform as expected.

BRIEF DESCRIPTION OF THE DRAWINGS/FIGURES

Figure 2:
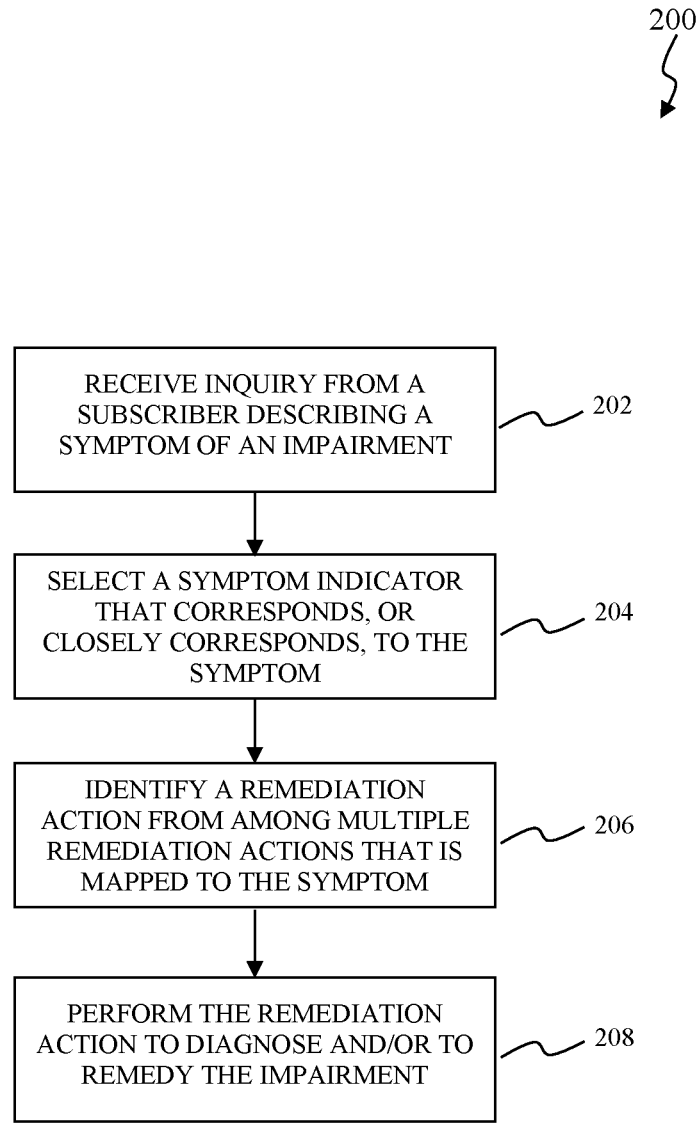
Figure 3:
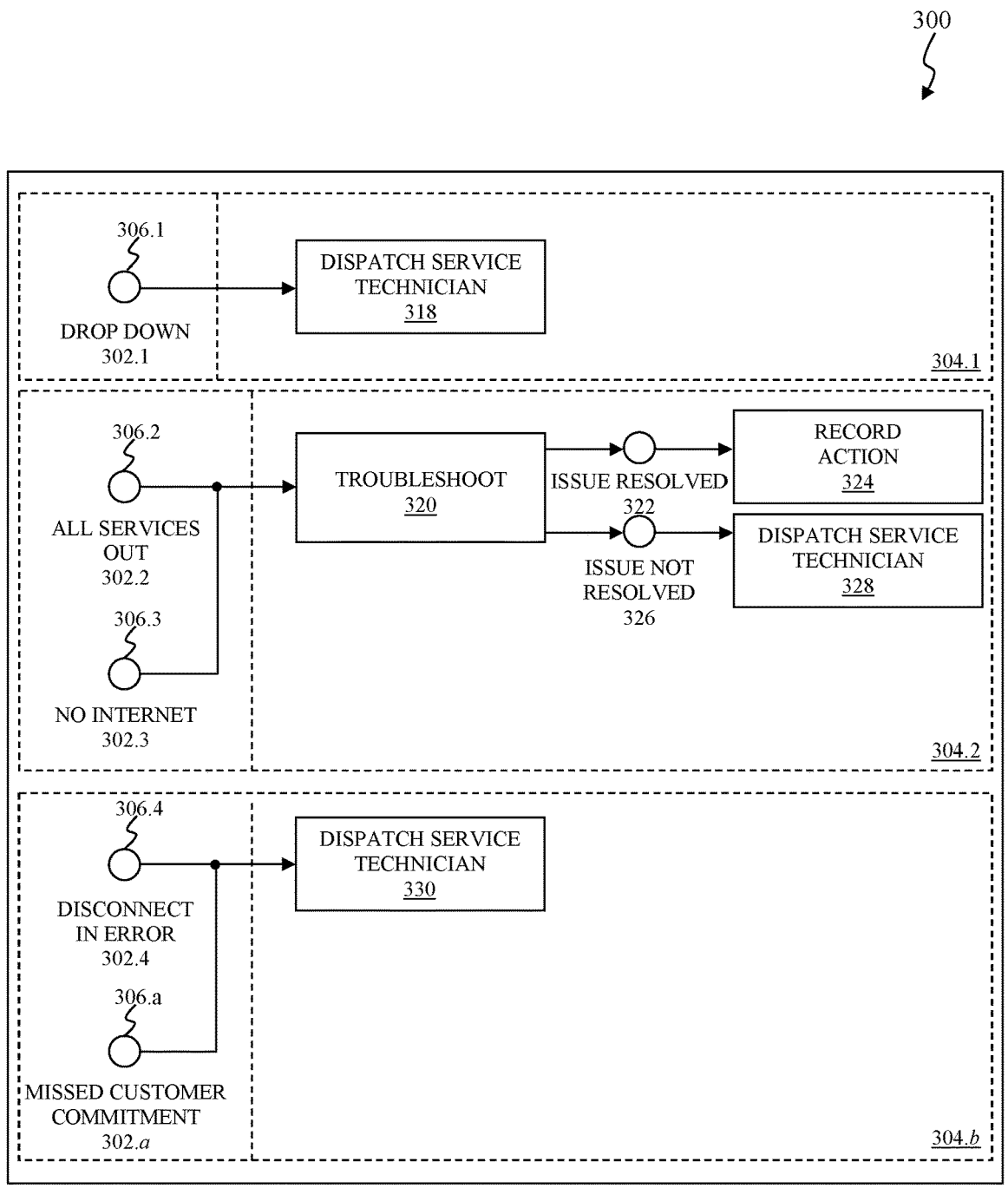
Figure 4:
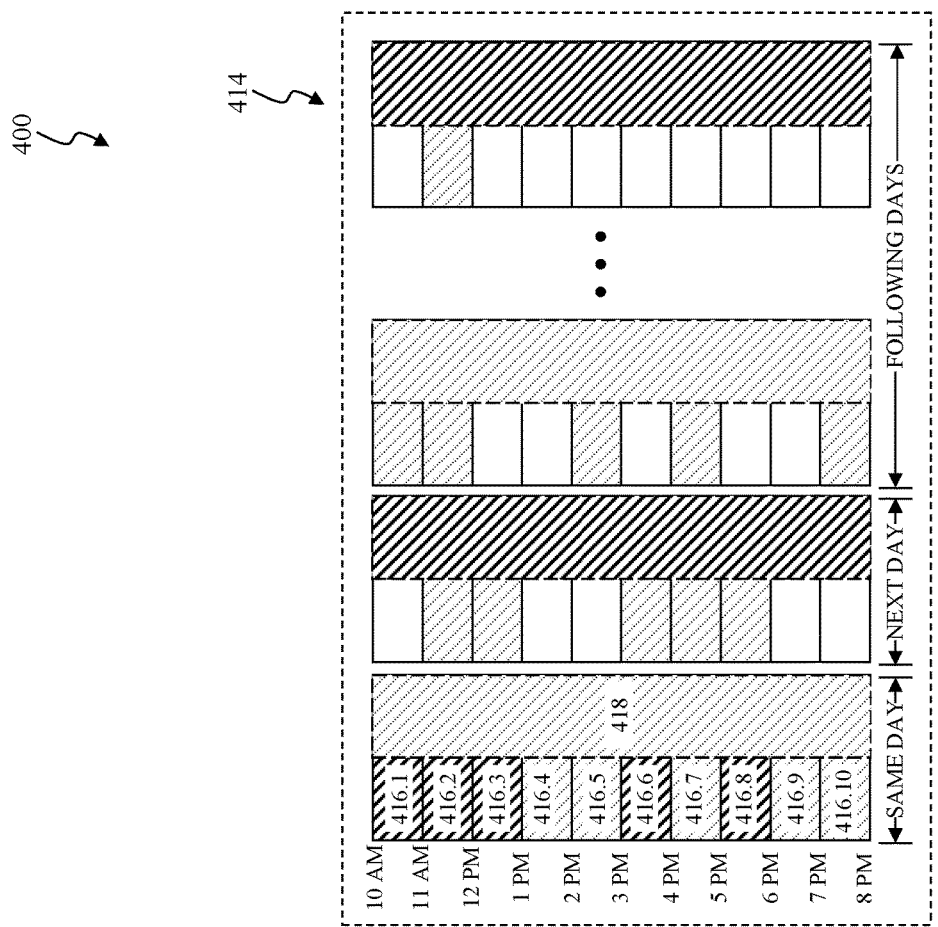
Figure 4:
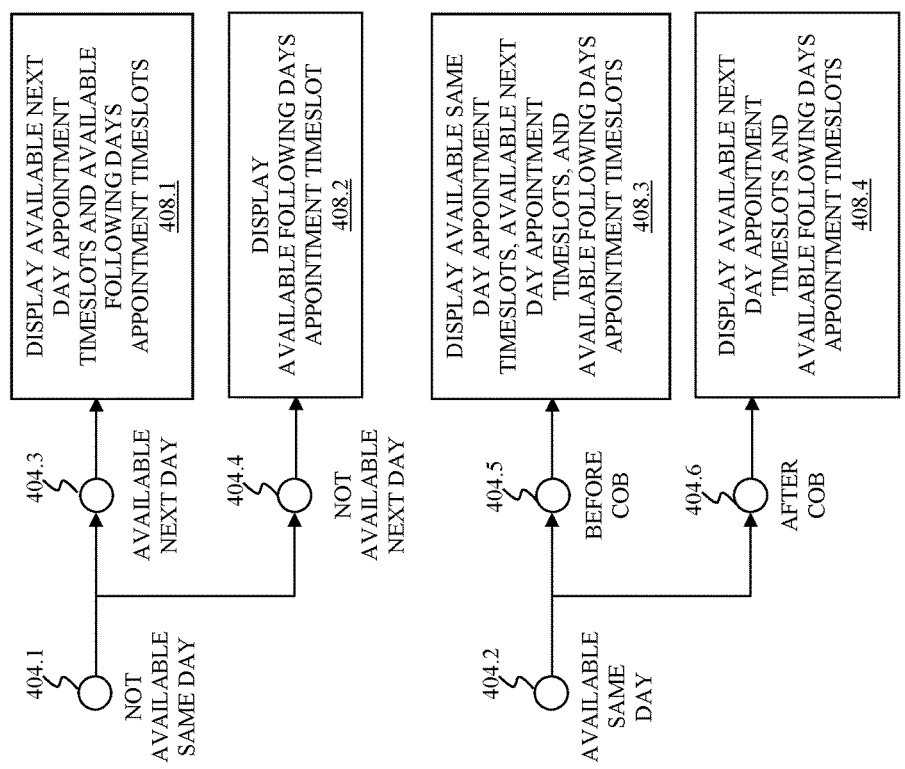
Figure 5:
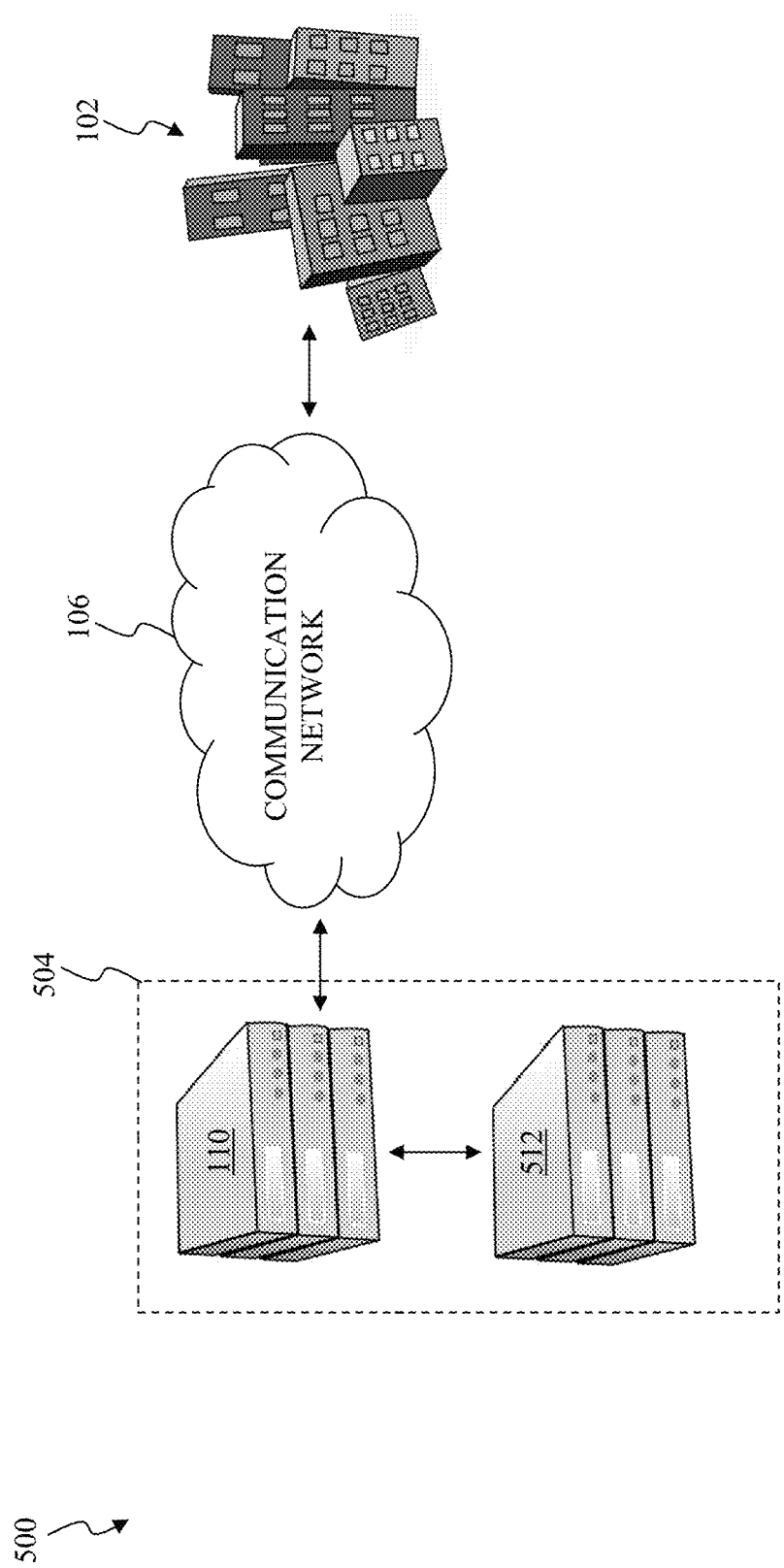
Figure 6:
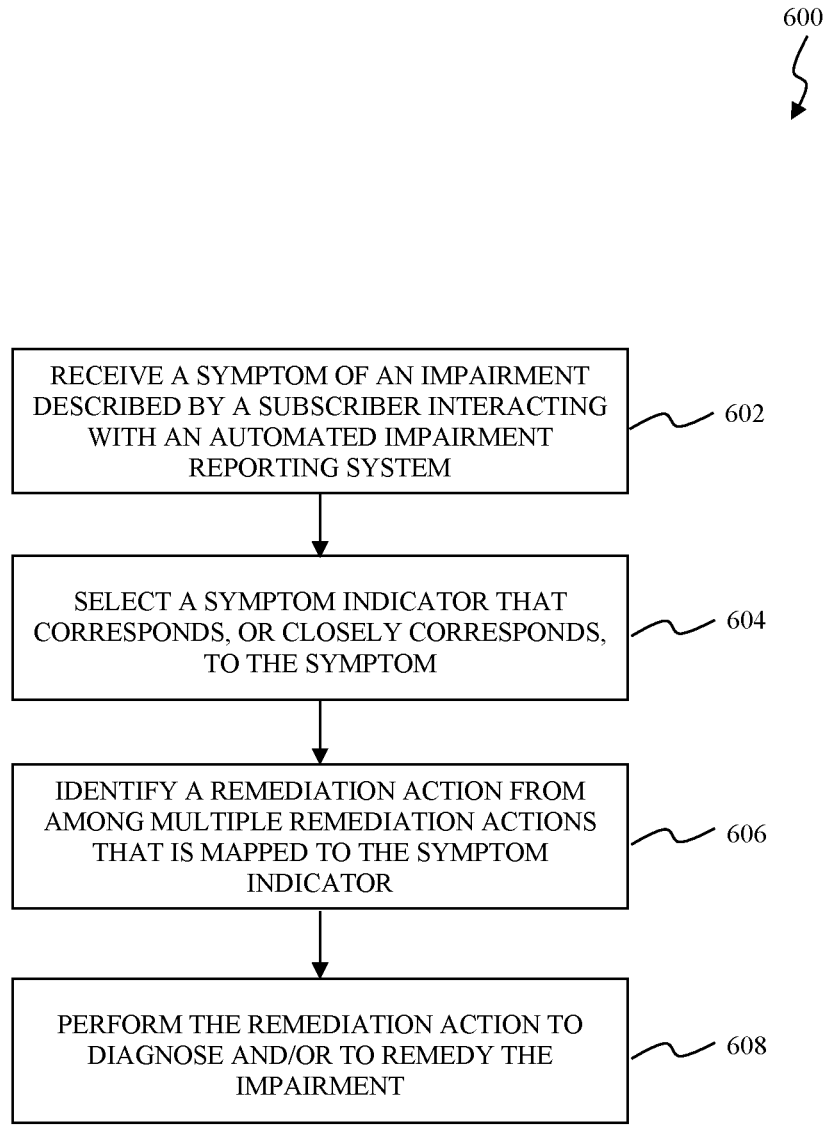
Figure 7:
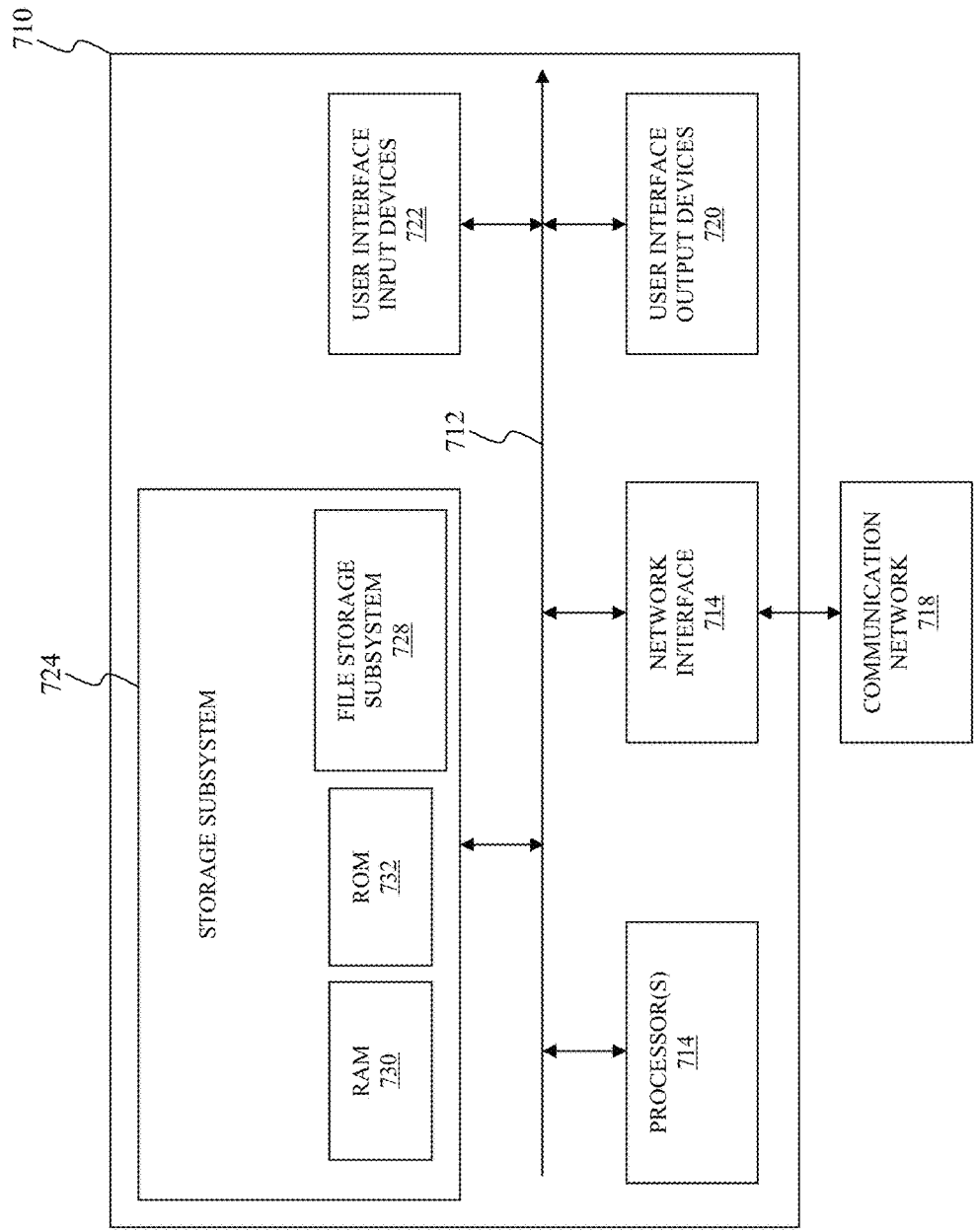

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings:

FIG. 1 graphically illustrates a first exemplary service provider network according to some exemplary embodiments of the present disclosure;

FIG. 2 illustrates a flowchart of a first exemplary operation for diagnosing and/or remedying the impairment within the first exemplary service provider network according to some exemplary embodiments of the present disclosure;

FIG. 3 graphically illustrates an exemplary graphical user interface (GUI) that can be implemented within the exemplary service provider network to diagnose and/or remedy the impairment according to some exemplary embodiments of the present disclosure;

FIG. 4 graphically illustrates an exemplary dispatch service technician action that can be scheduled using the exemplary graphical user interface (GUI) according to some exemplary embodiments of the present disclosure;

FIG. 5 graphically illustrates a second exemplary service provider network according to some exemplary embodiments of the present disclosure;

FIG. 6 illustrates a flowchart of a second exemplary operation for diagnosing and/or remedying the impairment within the second exemplary service provider network according to some exemplary embodiments of the present disclosure; and FIG. 7 graphically illustrates a simplified block diagram of a computer system suitable for use with embodiments described herein, as well as circuit design and circuit embodiments of the technology, according to an exemplary embodiment of the present disclosure.

The present disclosure will now be described with reference to the accompanying drawings.

DETAILED DESCRIPTION OF THE DISCLOSURE

Overview

Systems, methods, and apparatuses disclosed herein can receive an inquiry from a subscriber of a service that describes a symptom of an impairment within the service provider network that is being experienced by the subscriber which is causing the service to not perform as expected. These systems, methods, and apparatuses can identify a symptom indicator from among multiple symptom indicators that corresponds, or most closely corresponds, to the symptom that is described by the subscriber. Thereafter, these systems, methods, and apparatuses can identify a remediation action from among multiple remediation actions that corresponds to the symptom indicator. In some situations, these systems, methods, and apparatuses can perform the remediation action to diagnose and/or to remedy the impairment within the service provider network.

First Exemplary Service Provider Network

FIG. 1 graphically illustrates a first exemplary service provider network according to some exemplary embodiments of the present disclosure. In the exemplary embodiment illustrated in FIG. 1, a service provider network 100 can deliver a service to one or more subscriber premises within the service provider network 100. In some embodiments, the service provider network 100 can receive a symptom of an impairment within the service provider network 100 that is being experienced by the subscriber which is causing the service to not perform as expected. For example, the symptom can include, or be related to, a black screen, pixelization of a movie or a television program, lack of sound for the movie or the television program, intermittent connectivity, slow speed, no internet connectivity, no dial-tone, and/or an inability to receive electronic mail (email) messages among others to provide some examples. In these embodiments, the service provider network 100 can receive an inquiry, such as a telephone call, a short message service (SMS) text message, or an electronic mail (email) message to provide some examples, from a subscriber of the service that is associated with the one or more subscriber premises that describes the symptom of the impairment within the service provider network 100. As to be described in further detail below, the service provider network 100 can identify a symptom indicator from among multiple symptom indicators that corresponds, or most closely corresponds, to the symptom that is described by the subscriber. As used herein, the term "most closely corresponds" is meant to indicate that one of the multiple symptom indicators is the symptom indicator from among the multiple symptom indicators that is the most related to the symptom that is described by the subscriber when compared to other symptom indicators from among the multiple symptom indicators. Thereafter, the service provider network 100 can identify a remediation action from among multiple remediation actions that corresponds to the symptom indicator. In some embodiments, the service provider network 100 can perform the remediation action to diagnose and/or to remedy the impairment within the service provider network 100. In these embodiments, the remediation action can include a real-time troubleshooting of the service provider network 100 to diagnose the impairment within the service provider network 100, and/or scheduling of a dispatch of a service technician of the service provider network 100 to diagnose and/or to remedy the impairment within the service provider network 100. However, those skilled in the relevant art(s) will recognize that other remediation actions are possible without departing from the spirit and scope of the present disclosure. In the exemplary embodiment illustrated in FIG. 1, the service provider network 100 can include subscriber premises 102 and a service provider system 104 that are communicatively coupled to one another via a communication network 106.

The subscriber premises 102 can include one or more building and/or non-building structures that receive the service from the service provider network 100. Generally, the one or more building structures refer to any suitable structure or structures that are designed for human occupancy and can include one or more residential, industrial, and/or commercial building structures to provide some examples. Generally, the one or more non-building structures refer to any suitable structure or structures that are not designed for human occupancy and can include one or more residential, industrial, and/or commercial non-building structures to provide some examples. In some embodiments, the subscriber premises 102 can include electronic devices that receive the service from the service provider network 100 and/or access points that facilitate the services between the service provider system 104 and the electronic devices via the communication network 106. Generally, the one or more electronic devices represent any suitable mechanical, electrical, and/or electromechanical devices that can communicate electronic information to and/or from the service provider system 104 via the communication network 106 and/or the one or more access points. In some embodiments, the one or more electronic devices can include mobile telephony devices, such as mobile phones, mobile computing devices, mobile internet devices, such as tablet computers and/or laptop computers, video game consoles, portable media players, peripheral devices, such as wireless speakers, mice, keyboards, monitors, printers, and/or scanners, internet capable appliances, smart televisions, video streaming devices, video set-top boxes, and/or other suitable communication devices that are capable of wireless communication that will be recognized by those skilled in the relevant art(s) without departing from the spirit and scope of the present disclosure. Generally, the one or more access points represent any suitable mechanical, electrical, and/or electromechanical devices that can communicate electronic information to and/or from the subscriber premises 102 via the communication network 106. In some embodiments, the one or more access points can include wireless routers, cable modems, set-top boxes (STBs), digital subscriber line (DSL) modems, WiFi signal extenders, and/or other suitable communication devices that can communicate electronic information to and/or from the subscriber premises 102 via the communication network 106 that will be recognized by those skilled in the relevant art(s) without departing from the spirit and scope of the present disclosure.

The service provider system 104 represents one or more computer systems, an exemplary embodiment of which is to be described in further detail below, which facilitate delivery of the service to the subscriber premises 102. In some embodiments, the service can include, for example, delivery of media content, such as movies, television programs, advertising, and/or electronic programing guides (EPGs) to provide some examples, internet access, and/or telephone service. As illustrated in FIG. 1, the service provider system 104 can receive the inquiry from the subscriber describing the symptom of the impairment within the service provider network 100 that is being experienced by the subscriber which is causing the service to not perform as expected. As to be described in further detail below, the service provider system 104 can identify the symptom indicator that corresponds, or most closely corresponds, to the symptom that is described by the subscriber. Thereafter, the service provider system 104 can identify the remediation action that corresponds to the symptom indicator. In some embodiments, the service provider system 104 can perform the remediation action to diagnose and/or to remedy the impairment within the service provider network 100. In the exemplary embodiment illustrated in FIG. 1, the service provider system 104 can include a service provider server 110, an administrative server 112, and/or an administrative workstation 114.

The service provider server 110 provides the service to the subscriber premises 102 to deliver electronic information, such as video, audio, and/or data to provide some examples, to the subscriber premises 102 in a downstream direction. As used herein, the term "downstream direction" refers to the transfer of the electronic information from the service provider system 104 to the subscriber premises 102. As part of the service, the service provider server 110 can receive electronic information, such as video, audio, and/or data to provide some examples, from the subscriber premises 102 in an upstream direction. As used herein, the term "upstream direction" refers to the transfer of the electronic information from the subscriber premises 102 to the service provider system 104.

The administrative server 112 represents one or more computer systems, an exemplary embodiment of which is to be described in further detail below, which manages the service. As to be described in further detail below, the administrative workstation 114 can receive the inquiry from the subscriber whose service is affected by the impairment within the service provider network 100. In some embodiments, the administrative server 112 can receive the symptom indicator from the administrative workstation 114 that corresponds, or most closely corresponds, to the symptom that is described by the subscriber in the inquiry. In these embodiments, the symptom indicator can be implemented as an alphanumeric service code. For example, the administrative server 112 can receive the alphanumeric service code of 111 from the administrative workstation 114 that corresponds to the symptom of <<all services out>> being described by the subscriber.

After receiving the inquiry from the subscriber, the administrative server 112 can identify the remediation action from among the multiple remediation actions that corresponds to the symptom indicator. In some embodiments, the multiple remediation actions can be mapped, or assigned, to different symptom indicators that correspond to various symptoms of various impairments within the service provider network 100. In these embodiments, the administrative server 112 can identify the remediation action from among the multiple remediation actions that is mapped, or assigned, to the symptom indicator in response to receiving the symptom indicator. For example, the administrative server 112 can map, or assign, the alphanumeric service code of 111 that corresponds to the symptom of <<all services out>> to the real-time troubleshooting of the service provider network 100. In this example, the administrative server 112 can identify the real-time troubleshooting of the service provider network 100 as the remediation action in response to receiving the alphanumeric service code of 111 that corresponds to the symptom of <<all services out>>. In some embodiments, the administrative server 112 can provide the remediation action that corresponds to the symptom indicator to the administrative workstation 114 to perform the remediation action as to be described in further detail below.

The administrative workstation 114 represents one or more computer systems, an exemplary embodiment of which is to be described in further detail below, which oversees the operation of the service provider network 100. In the exemplary embodiment illustrated in FIG. 1, the administrative workstation 114 can receive the inquiry from the subscriber whose service is affected by the impairment within the service provider network 100. In some embodiments, a customer service representative of the service provider network 100 operating the administrative workstation 114 can receive the inquiry from the subscriber whose service is affected by the impairment within the service provider network 100. In the exemplary embodiment illustrated in FIG. 1, the administrative workstation 114 can identify a symptom indicator from among multiple symptom indicators that corresponds, or most closely corresponds, to the symptom that is described by the subscriber. In some embodiments, the multiple symptom indicators can be mapped, or assigned, to various symptoms of various impairments within the service provider network 100. For example, the administrative workstation 114 can identify the alphanumeric service code of 111 in response to the symptom of <<all services out>> being described by the subscriber. In some embodiments, the administrative workstation 114 can provide the symptom indicator that corresponds, or most closely corresponds, to the symptom that is described by the subscriber to the administrative server 112 to identify the remediation action therefrom as described above.

After receiving the remediation action from the administrative server 112, the administrative workstation 114, the customer service representative, and/or the subscriber can perform the remediation action to diagnose and/or to remedy the impairment within the service provider network 100. In some embodiments, each of the multiple remediation actions, as described above, includes one or more actions, procedures, routines, instructions, directions and/or the like that can be performed to diagnose and/or to remedy the impairment within the service provider network 100. In these embodiments, the administrative workstation 114 can display the one or more actions, procedures, routines, instructions, directions and/or the like included within the remediation action. In these embodiments, the administrative workstation 114, the customer service representative, and/or the subscriber can perform the one or more actions, procedures, routines, instructions, directions and/or the like included within the remediation action to diagnose and/or to remedy the impairment within the service provider network 100. For example, the administrative workstation 114 can receive the real-time troubleshooting of the service provider network 100 that is mapped to the alphanumeric service code of 111 that corresponds to the symptom of <<all services out>> from the administrative server 112. In this example, the administrative workstation 114, the customer service representative, and/or the subscriber can perform the real-time troubleshooting of the service provider network 100 to diagnose and/or to remedy the impairment within the service provider network 100.

The communication network 106 communicatively couples the subscriber premises 102 and the service provider system 104. The communication network 106 can implemented as a wireless communication network, a wireline communication network, and/or any combination thereof that will be apparent to those skilled in the relevant art(s) without departing from the spirit and scope of the present disclosure. In some embodiments, the communication network 106 can include a hybrid fiber-coaxial (HFC) network that combines optical fiber and coaxial cable to deliver the electronic information, such as the video, the audio, and/or the data to provide some examples, from the service provider system 104 to the subscriber premises 102 in the downstream direction and/or to deliver the electronic information from the subscriber premises 102 to the service provider system 104 or in the upstream direction. In some embodiments, the communication network 106 can include a fiber to the home (FTTH) network that utilizes optical fiber for at least a portion of the communication network 106 to deliver the electronic information, such as the video, the audio, and/or the data to provide some examples, from the service provider system 104 to the subscriber premises 102 in the downstream direction and/or to deliver the electronic information from the subscriber premises 102 to the service provider system 104 or in the upstream direction.

Exemplary Operations of the First Exemplary Service Provider Network

FIG. 2 illustrates a flowchart of a first exemplary operation for diagnosing and/or remedying the impairment within the first exemplary service provider network according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 for diagnosing and/or remedying the impairment within a service provider network, such as the service provider network 100 as described above in FIG. 1. The operational control flow 200 can be executed by one or more computer systems, such as the administrative server 112 and/or the administrative workstation 114 as described above in FIG. 1 to provide some examples.

At operation 202, the operational control flow 200 receives an inquiry, such as a telephone call, a short message service (SMS) text message, or an electronic mail (email) message to provide some examples, from a subscriber that describes a symptom of an impairment that causes the service to not perform as expected. For example, the symptom can include, or be related to, a black screen, pixelization of a movie or a television program, lack of sound for the movie or television program, intermittent connectivity, slow speed, no internet connectivity, no dial-tone, and/or an inability to receive electronic mail (email) messages to provide some examples.

At operation 204, the operational control flow 200 selects a symptom indicator that corresponds, or most closely corresponds, to the symptom from operation 202. In some embodiments, the symptom indicator can be implemented as an alphanumeric service code. For example, the operational control flow 200 can select the alphanumeric service code of 111 that corresponds to the symptom of <<all services out>> being described by the subscriber.

At operation 206, the operational control flow 200 identifies a remediation action from among multiple remediation actions that is mapped, or assigned, to the symptom indicator from operation 204. In some embodiments, the multiple remediation actions can be mapped, or assigned, to different symptom indicators that correspond to various symptoms of various impairments within the service provider network 100. In these embodiments, the operational control flow 200 can select the remediation action from among the multiple remediation actions that corresponds to the symptom indicator from operation 204. For example, the operational control flow 200 can map the alphanumeric service code of 111 that corresponds to the symptom of <<all services out>> to the real-time troubleshooting of the service provider network 100. In this example, the operational control flow 200 can select the real-time troubleshooting of the service provider network 100 as the remediation action in response to selecting the alphanumeric service code of 111 at operation 204.

At operation 208, the operational control flow 200 performs the remediation action from operation 206 to diagnose and/or to remedy the impairment from operation 202. In some embodiments, each of the multiple remediation actions from operation 206 can include one or more actions, procedures, routines, instructions, directions and/or the like that can be performed to diagnose and/or to remedy the impairment from operation 202. In these embodiments, the operational control flow 200 can perform the one or more actions, procedures, routines, instructions, directions and/or the like to diagnose and/or to remedy the impairment from operation 202. For example, the operational control flow 200 can select the real-time troubleshooting of the service provider network 100 that is mapped to the alphanumeric service code of 111 that corresponds to the symptom of <<all services out>>. In this example, the operational control flow 200 can perform the real-time troubleshooting of the service provider network 100 to diagnose and/or to remedy the impairment from operation 202.

Exemplary Graphical User Interface (GUI) that can be Implemented within the First Exemplary Service Provider Network FIG. 3 graphically illustrates an exemplary graphical user interface (GUI) that can be implemented within the exemplary service provider network to diagnose and/or remedy the impairment according to some exemplary embodiments of the present disclosure. As described above, a customer service representative of a service provider network, such as the service provider network 100 as described above, can receive the inquiry from the subscriber whose service is affected by the impairment within the service provider network. As to be described in further detail below, one or more first computer systems, such as the administrative workstation 114 as described above in FIG. 1, can execute a graphical user interface (GUI) 300 to interface with the customer service representative. In some embodiments, the customer service representative can utilize the GUI 300 to identify the alphanumeric service code that corresponds, or most closely corresponds, to the symptom that is described by the subscriber. Thereafter, the one or more first computer systems can receive the remediation action that corresponds to the alphanumeric service code from one or more second computer systems, such as the administrative server 112 as described above in FIG. 1. In some embodiments, the GUI 300 can display the remediation action to allow the remediation action to be performed by the customer service representative and/or the subscriber to diagnose and/or to remedy the impairment within the service provider network.

As illustrated in FIG. 3, the GUI 300 includes alphanumeric service codes 302.1 through 302.a that correspond to remediation actions 304.1 through 304.b. In the exemplary embodiment illustrated in FIG. 3, the GUI 300 can include multiple GUI selection elements 306.1 through 306.a, such as buttons, sliders, list boxes, spinners, drop-down lists, menus, menu bars, toolbars, combo boxes, and/or icons to provide some examples, that correspond to the alphanumeric service codes 302.1 through 302.a. In the exemplary embodiment illustrated in FIG. 3, the multiple GUI selection elements 306.1 through 306.a can be mapped, or assigned, to the alphanumeric service codes 302.1 through 302.a. For example, as illustrated in FIG. 3, these various symptoms can include, but are not limited to, a symptom of <<drop down>>, a symptom of <<all services out>>, a symptom of <<no internet>>, a symptom of <<disconnect in error>>, and/or a symptom of <<missed customer commitment>>. In this example, the symptom of <<drop down>> can be mapped, or assigned, to an alphanumeric service code of 302.1, the symptom of <<all services out>> can be mapped, or assigned, to an alphanumeric service code of 302.2, the symptom of <<no internet>> can be mapped, or assigned, to an alphanumeric service code of 302.3, the symptom of <<disconnect in error>> can be mapped, or assigned, to an alphanumeric service code of 302.4, and/or the symptom of <<missed customer commitment>> can be mapped, or assigned, to an alphanumeric service code of 302.a. However, this example is for exemplary purposes only and not limiting. Those skilled in the relevant art(s) will recognize that other symptoms and/or other alphanumeric service codes are possible without departing from the spirit and scope of the present disclosure. In this example, a multiple GUI selection element 306.1 can be mapped, or assigned to, the alphanumeric service code of 302.1, the multiple GUI selection element 306.2 can be mapped, or assigned to, the alphanumeric service code of 302.2, the multiple GUI selection element 306.3 can be mapped, or assigned to, the alphanumeric service code of 302.3, the multiple GUI selection element 306.4 can be mapped, or assigned to, the alphanumeric service code of 302.4, and the multiple GUI selection element 306.a can be mapped, or assigned to, the alphanumeric service code of 302.a.

In the exemplary embodiment illustrated in FIG. 3, the customer service representative can select a GUI selection element from among the multiple selection GUI elements 306.1 through 306.a that corresponds, or most closely corresponds, to the symptom that is described by the subscriber. In some embodiments, the one or more first computer systems can provide the alphanumeric service code from among the alphanumeric service codes 302.1 through 302.a that is mapped to the GUI selection element selected by the customer service representative to the one or more second computer systems. For example, the customer service representative can activate the GUI selection element 306.1 that has been mapped, or assigned, to the alphanumeric service code 302.1 in response to the symptom of <<drop down>> being described by the subscriber. In this example, the one or more first computer systems can provide the alphanumeric service code of 302.1 to the one or more second computer systems. As another example, the customer service representative can activate the GUI selection element 306.3 that has been mapped, or assigned, to the alphanumeric service code 302.3 in response to the symptom of symptom of <<no internet>> being described by the subscriber. In this example, the one or more first computer systems can provide the alphanumeric service code of 302.3 to the one or more second computer systems.

After providing the alphanumeric service code that is mapped, or assigned, to the GUI selection element selected by the customer service representative, the one or more first computer systems receives a remediation action from among the remediation actions 304.1 through 304.b from the one or more second computer systems that corresponds to the alphanumeric service code from among the alphanumeric service codes 302.1 through 302.a that has been selected by the customer service representative. In some embodiments, one or more of the remediation actions, such as the remediation action 304.2 to provide an example, from among the remediation actions 304.1 through 304.b can correspond to multiple alphanumeric service codes, such as the alphanumeric service code of 302.2 and the alphanumeric service code of 302.3 to provide some examples, from among the alphanumeric service codes 302.1 through 302.a. In the exemplary embodiment illustrated in FIG. 3, the GUI 300 can include one or more windows for displaying the remediation action received from the one or more second computer systems. In some embodiments, the one or more windows can include one or more container windows, one or more browser windows, one or more child windows, and/or one or more message windows to provide some examples for displaying the remediation action received from the one or more second computer systems.

As illustrated in FIG. 3, the remediation actions 304.1 through 304.b can be as simple as a dispatch service technician action 318 and/or a dispatch service technician action 330 to schedule a dispatch of a service technician of the service provider network to diagnose and/or to remedy the impairment within the service provider network to provide some examples, although more complicated remediation actions are possible as will be recognized by those skilled in the relevant art(s) without departing from the spirit and scope of the present disclosure. In some embodiments, these more complicated remediation actions can be arranged to be a hierarchical arrangement of actions, procedures, routines, instructions, directions and/or the like having multiple selectable hierarchical branches. In these embodiments, the one or more first computer systems, the customer service representative, and/or the subscriber can perform one or more actions, procedures, routines, instructions, directions and/or the like from a top level, or body, of the hierarchical arrangement. Thereafter, in these embodiments, the customer service representative can leverage results from performing the level, or body, of the hierarchical arrangement to designate which hierarchical branch from among the multiple selectable hierarchical branches is to be next performed. In these embodiments, the hierarchical arrangement of actions can include GUI selection elements, examples of which have been described above, that are selectable by the customer service representative to designate which hierarchical branch from among the multiple selectable hierarchical branches is to next be performed. For example, as illustrated in FIG. 3, the one or more first computer systems can receive the remediation action 304.2 from the one or more second computer systems in response to providing among the alphanumeric service code 302.2 or the alphanumeric service code 302.3 to the one or more second computer systems. In this example, the remediation action 304.2 can include a troubleshoot action 320, an issue resolved GUI selection element 322, a record action 324, an issue not resolved GUI selection element 326, and a dispatch service technician action 328. In this example, the customer service representative and/or the subscriber can perform the troubleshoot action 320 to remedy the impairment within the service provider network. In some embodiments, the troubleshoot action 320 is based on the symptom that is described by the subscriber. In these embodiments, the one or more second computer systems can execute a diagnostic routine that corresponds, or most closely corresponds, to the symptom that is described by the subscriber. In these embodiments, the diagnostic routine can be selected from among multiple diagnostic routines that are available to diagnose and/or to remedy the impairment within the service provider network. In these embodiments, the troubleshoot action 320 can identify one or more mechanical, electrical, or electromechanical devices within the service provider network to repair or replace and/or one or more actions to be performed on one or more mechanical, electrical, or electromechanical devices within the service provider network by the customer service representative, the service technician, and/or the subscriber to remedy the impairment within the service provider network. Thereafter, the customer service representative can select the issue resolved GUI selection element 322 to indicate that the troubleshoot action 320 has remedied the impairment within the service provider network and the record action 324 is to next be performed. The record action 324 represents a record that can be stored by the one or more second computer systems that describes the subscriber, the inquiry from the subscriber, the symptom, the impairment, and/or the troubleshoot action 320. In some embodiments, the record action 324 can be used to track the subscriber, the inquiry from the subscriber, the symptom, the impairment, and/or the troubleshoot action 320. Otherwise, the customer service representative can select the issue not resolved GUI selection element 326 to indicate that the troubleshoot action 320 has not remedied the impairment within the service provider network and the dispatch service technician action 328 is to next be performed.

Exemplary Dispatch Service Technician Action that can be Scheduled Using the Exemplary Graphical User Interface (GUI)

FIG. 4 graphically illustrates an exemplary dispatch service technician action that can be scheduled using the exemplary graphical user interface (GUI) according to some exemplary embodiments of the present disclosure. As described above, a service provider network, such as the service provider network 100 to provide an example, can identify a remediation action from among multiple remediation actions that corresponds, or most closely corresponds, to the symptom that is described by the subscriber. In the exemplary embodiment illustrated in FIG. 4, the remediation action can include scheduling of a dispatch of a service technician of the service provider network to diagnose and/or to remedy the impairment within the service provider network. The discussion of FIG. 4 to follow is describe a graphical user interface (GUI) 400 that can be utilized by a customer service representative of the service provider network to schedule the dispatch of the service technician to diagnose and/or to remedy the impairment within the service provider network. In some embodiments, one or more computer systems, such as the administrative server 112 and/or the administrative workstation 114 to provide some examples, can execute the GUI 400 to allow the customer service representative to interface with these computer systems to schedule the dispatch of the service technician.

In the exemplary embodiment illustrated in FIG. 4, the one or more computer systems can analyze one or more service technician calendars 414 to determine the availability of the service technician, or a group of service technicians, to be dispatched to diagnose and/or to remedy the impairment within the service provider network. In some embodiments, each service technician, or each group of service technicians, within the service provider network can have its own service technician calendar from among the one or more service technician calendars 414 to identify its availability to diagnose and/or to remedy the impairment within the service provider network.

As illustrated in FIG. 4, the service technician calendar 414 can identify the availability of the service technician, or the group of service technicians, over the same day, the next day, and/or the following days. As illustrated in FIG. 4, the service technician calendar 414 includes service availability timeslots 416.1 through 416.10 that correspond to times between 10:00 AM and 8:00 PM that may be available for scheduling as represented by no shading or unavailable for scheduling as represented by shading. It should be noted that the service technician calendar 414 as illustrated in FIG. 4 is for exemplary purposes only and is not limiting. Those skilled in the relevant art(s) will recognize that other service technician calendars are possible without departing from the spirit and scope of the present disclosure. In some embodiments, the service technician calendar 414 can include an all-day service timeslot 418 for the same day, the next day, and/or the following days. In these embodiments, the one or more computer systems can use the all-day service timeslot 418 for the same day, the next day, and/or the following days to schedule the dispatch the service technician in response to critical symptoms, also referred to as "must-do" symptoms, being described by the subscriber. In some embodiments, these critical symptoms can include the symptom of <<drop down>> as described above in FIG. 3 that refers to a communication cable being down that causes the service to not perform as expected.

In the exemplary embodiment illustrated in FIG. 4, the GUI 400 can graphically illustrate the availability of the service technician, or the group of service technicians, over the same day, the next day, and/or the following days. As illustrated in FIG. 4, the GUI 400 can include multiple GUI output elements 404.1 through 404.6, such as buttons, sliders, list boxes, spinners, drop-down lists, menus, menu bars, toolbars, combo boxes, and/or icons to provide some examples, that correspond to the availability of the service technician, or the group of service technicians, over the same day, the next day, and/or the following days.

In the exemplary embodiment illustrated in FIG. 4, the GUI output elements 404.1 through 404.6 indicate whether the service technician, or the group of service technicians, has availability to be dispatched to diagnose and/or to remedy the impairment within the service provider network. In some embodiments, the GUI output element 404.1 can indicate that the service technician, or the group of service technicians, has no same day availability to be dispatched to diagnose and/or to remedy the impairment within the service provider network. In some embodiments, the GUI output elements 404.3 and 404.4 indicate whether the service technician, or the group of service technicians, has next day availability to be dispatched to diagnose and/or to remedy the impairment within the service provider network in response to the service technician, or the group of service technicians, having no same day availability. In these embodiments, the GUI output elements 404.3 can indicate that the service technician, or the group of service technicians, has next day availability to be dispatched to diagnose and/or to remedy the impairment within the service provider network. In these embodiments, the GUI output elements 404.4 can that the service technician, or the group of service technicians, has no next day availability to be dispatched to diagnose and/or to remedy the impairment within the service provider network.

In some embodiments, the GUI output element 404.2 can indicate that the service technician, or the group of service technicians, has same day availability to be dispatched to diagnose and/or to remedy the impairment within the service provider network. In some embodiments, the GUI output element 404.5 can indicate that the inquiry from the subscriber of the service that describes the symptom was received before close of business (COB) such that the service technician, or the group of service technicians, can be dispatched to diagnose and/or to remedy the impairment within the service provider network on the same day. In some embodiments, the GUI output element 404.6 can indicate that the inquiry from the subscriber of the service that describes the symptom was received after close of business (COB) such that the service technician, or the group of service technicians, cannot be dispatched to diagnose and/or to remedy the impairment within the service provider network on the same day.

In the exemplary embodiment illustrated in FIG. 5, once the availability of the service technician, or the group of service technicians, over the same day, the next day, and/or the following days has been identified, the one or more computer systems can display one or more available timeslots from among the same day, the next day, and/or the following days to schedule the dispatch of the service technician, or the group of service technicians. In the exemplary embodiment illustrated in FIG. 4, the GUI 400 can include GUI output windows 408.1 through 408.4 for displaying the availability of the service technician, or the group of service technicians, over the same day, the next day, and/or the following days. In some embodiments, the GUI output windows 408.1 through 408.4 can include one or more container windows, one or more browser windows, one or more child windows, and/or one or more message windows to provide some examples for displaying the availability of the service technician, or the group of service technicians, over the same day, the next day, and/or the following days.

In some embodiments, the GUI output window 408.1 can display the availability of the service technician, or the group of service technicians over the next day and/or the following days. In these embodiments, the GUI output window 408.1 can display those service availability timeslots from among service availability timeslots 416.1 through 416.10 over the next day and/or the following days that may be available for scheduling as represented by no shading. In some embodiments, the GUI output window 408.2 can display the availability of the service technician, or the group of service technicians over the following days. In these embodiments, the GUI output window 408.2 can display those service availability timeslots from among service availability timeslots 416.1 through 416.10 over the following days that may be available for scheduling as represented by no shading. In some embodiments, the GUI output window 408.3 can display the availability of the service technician, or the group of service technicians over the same day, the next day, and/or the following days. In these embodiments, the GUI output window 408.2 can display those service availability timeslots from among service availability timeslots 416.1 through 416.10 over the same day, the next day, and/or the following days that may be available for scheduling as represented by no shading. In some embodiments, the GUI output window 408.4 can display the availability of the service technician, or the group of service technicians over the next day and/or the following days. In these embodiments, the GUI output window 408.2 can display those service availability timeslots from among service availability timeslots 416.1 through 416.10 over the next day and/or the following days that may be available for scheduling as represented by no shading. In some embodiments, the GUI output window 408.1 through 408.4 can display the all-day service timeslot 418 for the same day, the next day, and/or the following days to schedule the dispatch the service technician, or the group of service technicians, in response to critical symptoms. In these embodiments, the one or more computer systems can schedule the dispatch of the service technician, or the group of service technicians, during the all-day service timeslot 418 for the same day, the next day, and/or the following days even if the all-day service timeslot 418 was previously scheduled.

In the exemplary embodiment illustrated in FIG. 4, once the one or more available timeslots from among the same day, the next day, and/or the following days have been scheduled, the customer service representative can offer these available timeslots to the subscriber to schedule the dispatch of the service technician, or the group of service technicians to diagnose and/or to remedy the impairment within the service provider network.

Second Exemplary Service Provider Network

FIG. 5 graphically illustrates a second exemplary service provider network according to some exemplary embodiments of the present disclosure. In the exemplary embodiment illustrated in FIG. 5, a service provider network 500 can deliver a service to one or more subscriber premises within the service provider network 500. In some embodiments, the service provider network 500 can receive a symptom of an impairment within the service provider network 500 that is being experienced by the subscriber which is causing the service to not perform as expected. For example, the symptom can include, or be related to, a black screen, pixelization of a movie or a television program, lack of sound for the movie or the television program, intermittent connectivity, slow speed, no internet connectivity, no dial-tone, and/or an inability to receive electronic mail (email) messages among others to provide some examples. In these embodiments, the subscriber can interact with an automated impairment reporting system of the service provider network 500 to describe the symptom of the impairment within the service provider network 500. In these embodiments, the automated impairment reporting system can include an interactive voice response (IVR) system, a chatbot, and/or a user application that is executing on a computing device, such as a mobile telephony device, such as a mobile phone, a mobile computing device, a mobile internet device, such as a tablet computer and/or a laptop computer to provide some examples. In these embodiments, the automated impairment reporting system can provide the symptom that is described by the subscriber to the service provider network 500. As to be described in further detail below, the service provider network 500 can identify the symptom indicator from among multiple symptom indicators that corresponds, or most closely corresponds, to the symptom that is described by the subscriber. Thereafter, the service provider network 500 can identify the remediation action from among multiple remediation actions that corresponds to the symptom indicator. In some embodiments, the service provider network 500 can perform the remediation action to diagnose and/or to remedy the impairment within the service provider network 500. In the exemplary embodiment illustrated in FIG. 5, the service provider network 500 can include the subscriber premises 102 and a service provider system 504 that are communicatively coupled to one another via the communication network 106. The subscriber premises 102 and the communication network 106 are described above in FIG. 1 and will not be described in further detail in FIG. 5. The service provider network 500 shares many similar features as the service provider network 100 as described above. In some embodiments, the features of the administrative workstation 114 as described above in FIG. 1 have been integrated into the administrative server 512. In these embodiments, the service provider system 504 can be characterized as being an autonomous troubleshooting system independent of the customer service representative as described above in FIG. 1.

The service provider system 504 represents one or more computer systems, an exemplary embodiment of which is to be described in further detail below, which facilitate delivery of the service to the subscriber premises 102. As illustrated in FIG. 5, the service provider system 504 can receive the inquiry from the subscriber. As to be described in further detail below, the service provider system 504 can identify the symptom indicator that corresponds, or most closely corresponds, to the symptom that is described by the subscriber. Thereafter, the service provider system 504 can identify the remediation action that corresponds to the symptom indicator. In some embodiments, the service provider system 504 can perform the remediation action to diagnose and/or to remedy the impairment within the service provider network 500. In the exemplary embodiment illustrated in FIG. 5, the service provider system 504 can include the service provider server 110 and an administrative server 512. The service provider server 110 is described above in FIG. 1 and will not be described in further detail in FIG. 5.

The administrative server 512 represents one or more computer systems, an exemplary embodiment of which is to be described in further detail below, which oversees the operation of the service provider network 500. In the exemplary embodiment illustrated in FIG. 5, the administrative server 512 can receive the inquiry from the subscriber whose service is affected by the impairment within the service provider network 500 in a substantially similar manner as the administrative workstation 114 as described above in FIG. 1. However, in some embodiments, the subscriber can interact with an automated impairment reporting system of the service provider network 500 to describe the symptom of the impairment within the service provider network 500. In these embodiments, the automated impairment reporting system can include an interactive voice response (IVR) system, a chatbot, and/or a user application that is executing on a computing device, such as a mobile telephony device, such as a mobile phone, a mobile computing device, a mobile internet device, such as a tablet computer and/or a laptop computer to provide some examples. In these embodiments, the automated impairment reporting system of the service provider network 500 can provide the symptom that is described by the subscriber to the administrative server 512.

In the exemplary embodiment illustrated in FIG. 5, the administrative server 512 can identify a symptom indicator from among multiple symptom indicators that corresponds, or most closely corresponds, to the symptom that is described by the subscriber in a substantially similar manner as the administrative server 112 as described above in FIG. 1. In the exemplary embodiment illustrated in FIG. 5, the administrative server 512 can, thereafter, identify the remediation action from among the multiple remediation actions that corresponds to the symptom indicator in a substantially similar manner as the administrative server 112 as described above in FIG. 1. After receiving the remediation action from the administrative server 512, the administrative server 512, the customer service representative, and/or the subscriber can perform the remediation action to diagnose and/or to remedy the impairment within the service provider network 500 in a substantially similar manner as the administrative workstation 114 as described above in FIG. 1.

Although the service provider network 100 is described as receiving the inquiry that describes the symptom in FIG. 1 and the service provider network 500 is described as interacting with the automated impairment reporting system to describe the symptom of the impairment in FIG. 5, those skilled in the relevant art(s) will recognize that the the service provider network 100 and/or the service provider network 500 can intelligently detect the symptom that is being described by the inquiry and/or the automated impairment reporting system, respectively, without departing from the spirit and scope of the present disclosure. In some embodiments, the service provider network 100 and/or the service provider network 500 can identify the symptom indicator from among multiple symptom indicators that corresponds, or most closely corresponds, to the symptom that is intelligently detected. Thereafter, the service provider network 100 and the service provider network 500 can identify the remediation action from among the multiple remediation actions that corresponds to the symptom indicator as described above in FIG. 1 and FIG. 5, respectively.

Exemplary Operations of the Second Exemplary Service Provider Network

FIG. 6 illustrates a flowchart of a second exemplary operation for diagnosing and/or remedying the impairment within the second exemplary service provider network according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 600 for diagnosing and/or remedying the impairment within a service provider network, such as the service provider network 500 as described above in FIG. 5. The operational control flow 600 can be executed by one or more computer systems, such as the administrative server 512 as described above in FIG. 5 to provide some examples.

At operation 602, the operational control flow 600 receives a symptom that is described by a subscriber interacting with an automated impairment reporting system. For example, the symptom can include, or be related to, a black screen, pixelization of a movie or a television program, lack of sound for the movie or television program, intermittent connectivity, slow speed, no internet connectivity, no dial-tone, and/or an inability to receive electronic mail (email) messages to provide some examples. In some the embodiments, automated impairment reporting system can include an interactive voice response (IVR) system, a chatbot, and/or a user application that is executing on a computing device, such as a mobile telephony device, such as a mobile phone, a mobile computing device, a mobile internet device, such as a tablet computer and/or a laptop computer to provide some examples.

At operation 604, the operational control flow 600 selects a symptom indicator that corresponds, or most closely corresponds, to the symptom from operation 602. In some embodiments, the symptom indicator can be implemented as an alphanumeric service code. For example, the operational control flow 600 can select the alphanumeric service code of 111 that corresponds to the symptom of <<all services out>> being described by the subscriber.

At operation 606, the operational control flow 600 identifies a remediation action from among multiple remediation actions that is mapped, or assigned, to the symptom indicator from operation 604. In some embodiments, the multiple remediation actions can be mapped, or assigned, to different symptom indicators that correspond to various symptoms of various impairments within the service provider network 500. In these embodiments, the operational control flow 600 can select the remediation action from among the multiple remediation actions that corresponds to the symptom indicator from operation 604. For example, the operational control flow 600 can map the alphanumeric service code of 111 that corresponds to the symptom of <<all services out>> to the real-time troubleshooting of the service provider network 500. In this example, the operational control flow 600 can select the real-time troubleshooting of the service provider network 500 as the remediation action in response to selecting the alphanumeric service code of 111 or the alphanumeric service code of at operation 604.

At operation 608, the operational control flow 600 performs the remediation action from operation 606 to diagnose and/or to remedy the impairment from operation 602. In some embodiments, each of the multiple remediation actions from operation 606 can include one or more actions, procedures, routines, instructions, directions and/or the like that can be performed to diagnose and/or to remedy the impairment from operation 602. In these embodiments, the operational control flow 600 can perform the one or more actions, procedures, routines, instructions, directions and/or the like to diagnose and/or to remedy the impairment from operation 602. For example, the operational control flow 600 can select the real-time troubleshooting of the service provider network 500 that is mapped to the alphanumeric service code of 111 that corresponds to the symptom of <<all services out>>. In this example, the operational control flow 600 can perform the real-time troubleshooting of the service provider network 500 to diagnose and/or to remedy the impairment from operation 602.

Exemplary Computer System that can be Utilized within the Exemplary Service Provider Network FIG. 7 graphically illustrates a simplified block diagram of a computer system suitable for use with embodiments described herein, as well as circuit design and circuit embodiments of the technology, according to an exemplary embodiment of the present disclosure. The various electronic devices, for example, the service provider system 104, the service provider server 110, the administrative server 112, and/or the administrative server 114 as described above in FIG. 1 and/or the service provider system 504 and/or the administrative server 512 as described above in FIG. 5, can be implemented in hardware, firmware, software, or any combination thereof. The discussion of FIG. 7 to follow describes an exemplary computer system 710 that can be used for these electronic devices.

In the exemplary embodiment illustrated in FIG. 7, the computer system 710 typically includes at least one processor 714 which communicates with peripheral devices via bus subsystem 712. Typically, the at least processor 714 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).)

The computer system typically includes an operating system, such as Microsoft's Windows, Sun Microsystems's Solaris, Apple Computer's MacOs, Linux or UNIX. The computer system also typically can include a Basic Input/Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 7, these peripheral devices may include a storage subsystem 724, comprising a memory subsystem 726 and a file storage subsystem 728, user interface input devices 722, user interface output devices 720, and a network interface subsystem 716. The input and output devices allow user interaction with computer system 710. In the exemplary embodiment illustrated in FIG. 7, the network interface subsystem 716 provides an interface to outside networks, including an interface to a communication network 718, and is coupled via a communication network 718 to corresponding interface devices in other computer systems or machines. The communication network 718 may comprise many interconnected computer systems, machines and communication links. These communication links may be wired links, optical links, wireless links, or any other devices for communication of information. The communication network 718 can be any suitable computer network, for example a wide area network such as the Internet, and/or a local area network such as Ethernet. The communication network 718 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 722 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into the computer system 710 or onto the communication network 718. The user interface input devices 722 typically allow a user to identify objects, icons, text and the like that appear on some types of user interface output devices, for example, a display subsystem.

The user interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from the computer system 710 to the user or to another machine or computer system.

The memory subsystem 726 typically includes a number of memories including a main random-access memory ("RAM") 730 (or other volatile storage device) for storage of instructions and data during program execution and a read only memory ("ROM") 732 in which fixed instructions are stored. The file storage subsystem 728 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 728.

The bus subsystem 712 provides a device for letting the various components and subsystems of the computer system 710 communicate with each other as intended. Although the bus subsystem 712 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A method for remedying an impairment within a service provider network, the method comprising:
    receiving, by a first computer system within the service provider network, a symptom of the impairment that is being experienced by a subscriber;
    executing, by the first computer system, a graphical user interface (GUI) having a plurality of GUI selection elements that are mapped to a plurality of symptom indicators;
    receiving, by the first computer system, a selection of a GUI selection element from among the plurality of GUI selection elements that was selected while interfacing with the GUI;
    assigning, by the first computer system, the GUI selection element to a symptom indicator from among the plurality of symptom indicators that is mapped to the selected GUI selection element;
    receiving, by a second computer system within the service provider network, the symptom indicator from the first computer system;
    selecting, by the second computer system, a remediation action from among a plurality of remediation actions that corresponds to the symptom indicator, the remediation action including a hierarchical arrangement of remediation actions having a plurality of hierarchical branches of remediation actions;
    providing, by the second computer system, the remediation action to the first computer system to remedy the impairment within the service provider network;
    performing, by the first computer system, a top level action from among the plurality of hierarchical branches of remediation actions;
    designating, by the first computer system, a hierarchical branch from among the plurality of hierarchical branches of remediation actions to be performed in response to the top level action; and
    performing, by the first computer system, the hierarchical branch to remedy the impairment within the service provider network.

2. The method of claim 1, wherein the receiving the symptom comprises receiving an inquiry from the subscriber that describes the symptom being experienced by the subscriber.

3. The method of claim 1, wherein the receiving the symptom comprises receiving the symptom from an automated impairment reporting system that interacts with the subscriber to describe the symptom being experienced by the subscriber.

4. The method of claim 1, wherein the assigning comprises assigning the GUI selection element to an alphanumeric service code from among a plurality of alphanumeric service codes that is mapped to the selected GUI selection element.

5. The method of claim 4, wherein the selecting the remediation action comprises selecting the remediation action from among the plurality of remediation actions that corresponds to the alphanumeric service code.

6. The method of claim 1, wherein the remediation action comprises scheduling of a dispatch of a service technician of the service provider network to remedy the impairment within the service provider network.

7. The method of claim 1, wherein the plurality of GUI selection elements comprises two or more buttons, sliders, list boxes, spinners, drop-down lists, menus, menu bars, toolbars, combo boxes, or icons.

8. The method of claim 1, further comprising:
    receiving, by the first computer system, the remediation action from the second computer system; and
    displaying, by the first computer system, the remediation action in one or more windows of the GUI.

9. The method of claim 1, wherein the designating comprises leveraging a result from performing the top level action to designate which hierarchical branch from among the plurality of hierarchical branches of remediation actions is to be the hierarchical branch.

10. A service provider system for remedying an impairment within a service provider network, the service provider system comprising:
    an administrative workstation configured to:
        receive an inquiry from a subscriber describing a symptom of the impairment that is being experienced by the subscriber,
        execute a graphical user interface (GUI) having a plurality of GUI selection elements that are mapped to a plurality of symptom indicators,
        receive a selection of a GUI selection element from among the plurality of GUI selection elements that was selected while interfacing with the GUI, and assign the GUI selection element to a symptom indicator from among the plurality of symptom indicators that is mapped to the selected GUI selection element; and an administrative server configured to:
receive the symptom indicator from the administrative workstation,
select a remediation action from among a plurality of remediation actions that corresponds to the symptom indicator, the remediation action including a hierarchical arrangement of remediation actions having a plurality of hierarchical branches of remediation actions,
provide the remediation action to the administrative workstation to remedy the impairment within the service provider network,
perform a top level action from among the plurality of hierarchical branches of remediation actions,
designate a hierarchical branch from among the plurality of hierarchical branches of remediation actions to be performed in response to the top level action, and
perform the hierarchical branch to remedy the impairment within the service provider network.

11. The service provider system of claim 10, wherein the inquiry comprises a telephone call, a short message service (SMS) text message, or an electronic mail (email) message from the subscriber.

12. The service provider system of claim 10, wherein the symptom comprises a black screen, pixelization of a movie or a television program, lack of sound for the movie or the television program, intermittent connectivity, slow speed, no internet connectivity, no dial-tone, or an inability to receive electronic mail (email) messages.

13. The service provider system of claim 10, wherein the administrative workstation is configured to assign the GUI selection element to an alphanumeric service code from among a plurality of alphanumeric service codes that is mapped to the selected GUI selection element.

14. The service provider system of claim 13, wherein the administrative server is configured to select the remediation action from among the plurality of remediation actions that corresponds to the alphanumeric service code.

15. The service provider system of claim 10, wherein the remediation action comprises scheduling of a dispatch of a service technician of the service provider network to remedy the impairment within the service provider network.

16. The service provider system of claim 10, wherein the administrative workstation is further configured to:
receive the remediation action from the administrative server; and
display the remediation action in one or more windows of the GUI.

17. The service provider system of claim 10, wherein the administrative server is configured to leverage a result from performing the top level action to designate which hierarchical branch from among the plurality of hierarchical branches of remediation actions is to be the hierarchical branch.

18. A service provider system for remedying an impairment within a service provider network, the service provider system comprising:
a first memory that stores a mapping of a plurality of symptom indicators to a plurality of symptoms;
a first processor configured to execute first instructions stored in the first memory, the first instructions, when executed by the first processor, configuring the first processor to:
receive a symptom of the impairment that is being experienced by a subscriber,
execute a graphical user interface (GUI) having a plurality of GUI selection elements that are mapped to the plurality of symptom indicators,
receive a selection of a GUI selection element from among the plurality of GUI selection elements that was selected while interfacing with the GUI, and
assign the GUI selection element to a symptom indicator from among the plurality of symptom indicators that is mapped to the selected GUI selection element;
a second memory that stores a mapping of a plurality of remediation actions to the plurality of symptom indicators; and
a second processor configured to execute second instructions stored in the second memory, the second instructions, when executed by the second processor, configuring the second processor to:
receive the symptom indicator from the first processor,
select a remediation action from among the plurality of remediation actions that corresponds to the symptom indicator, the remediation action including a hierarchical arrangement of remediation actions having a plurality of hierarchical branches of remediation actions, and
provide the remediation action to the first processor to remedy the impairment within the service provider network,
wherein the first instructions, when executed by the first processor, further configure the first processor to:
perform a top level action from among the plurality of hierarchical branches of remediation actions,
designate a hierarchical branch from among the plurality of hierarchical branches of remediation actions to be performed in response to the top level action, and
perform the hierarchical branch to remedy the impairment within the service provider network.

19. The service provider system of claim 18, wherein the first instructions, when executed by the first processor, configure the first processor to receive the symptom from an inquiry from the subscriber that describes the symptom being experienced by the subscriber.

20. The service provider system of claim 18, wherein the first instructions, when executed by the first processor, configure the first processor to receive the symptom from an automated impairment reporting system that interacts with the subscriber to describe the symptom being experienced by the subscriber.

21. The service provider system of claim 18, wherein the first instructions, when executed by the first processor, configure the first processor to assign the GUI selection element to an alphanumeric service code from among a plurality of alphanumeric service codes that is mapped to the selected GUI selection element.

22. The service provider system of claim 21, wherein the second instructions, when executed by the second processor, configure the second processor to select the remediation action from among the plurality of remediation actions that corresponds to the alphanumeric service code.

23. The service provider system of claim 18, wherein the remediation action comprises scheduling of a dispatch of a service technician of the service provider network to remedy the impairment within the service provider network.

24. The service provider system of claim 18, wherein the plurality of GUI selection elements comprises two or more buttons, sliders, list boxes, spinners, drop-down lists, menus, menu bars, toolbars, combo boxes, or icons.

* * * * *